United States Patent
Tremaine et al.

(10) Patent No.: US 8,495,318 B2
(45) Date of Patent: Jul. 23, 2013

(54) MEMORY PAGE MANAGEMENT IN A TIERED MEMORY SYSTEM

(75) Inventors: Robert B. Tremaine, Stormville, NY (US); Robert W. Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 12/843,718

(22) Filed: Jul. 26, 2010

(65) Prior Publication Data

US 2012/0023300 A1 Jan. 26, 2012

(51) Int. Cl.
*G06F 12/00* (2006.01)
*G06F 13/00* (2006.01)

(52) U.S. Cl.
USPC ........... 711/162; 711/100; 711/154; 711/161; 711/170; 711/205; 711/207; 711/208

(58) Field of Classification Search
USPC ................. 711/100, 154, 161, 162, 170, 205, 711/207, 208
See application file for complete search history.

(56) References Cited

U.S. PATENT DOCUMENTS

| | | | |
|---|---|---|---|
| 6,532,538 B1 | 3/2003 | Cronk et al. | |
| 7,146,499 B2 | 12/2006 | Yellepeddy | |
| 7,287,140 B1 | 10/2007 | Asanovic et al. | |
| 7,424,584 B2 | 9/2008 | Mathews et al. | |
| 7,584,336 B2 | 9/2009 | Tremaine | |
| 2006/0095690 A1 | 5/2006 | Craddock et al. | |
| 2006/0236127 A1 | 10/2006 | Kurien et al. | |
| 2008/0280559 A1 | 11/2008 | Dandekar et al. | |
| 2011/0264855 A1* | 10/2011 | Kasako ......................... | 711/114 |

OTHER PUBLICATIONS

Leendert Van Doorn; "Hardware Virtualization Trends"; Jun. 14, 2006; pp. 1-44, IBM Corporation, T.J. Watson Research Center.
"Logical Partition Security in the IBM eserver pSerieis 690" 1st Ed., Feb. 14, 2002; 13 pages, , IBM Corporation.

* cited by examiner

*Primary Examiner* — Midys Rojas
(74) *Attorney, Agent, or Firm* — Cantor Colburn LLP

(57) ABSTRACT

Memory page management in a tiered memory system including a system that includes at least one page table for storing a plurality of entries, each entry associated with a page of memory and each entry including an address of the page and a memory tier of the page. The system also includes a control program configured for allocating pages associated with the entries to a software module, the allocated pages from at least two different memory tiers. The system further includes an agent of the control program capable of operating independently of the control program, the agent configured for receiving an authorization key to the allocated pages, and for migrating the allocated pages between the different memory tiers responsive to the authorization key.

24 Claims, 4 Drawing Sheets

MEMORY PAGE MANAGEMENT IN A TIERED MEMORY SYSTEM

BACKGROUND

Embodiments relate generally to computer memory, and more particularly to memory page management in a tiered memory system.

Historically, computer memory systems have been made up of memory pages that have architecturally homogenous characteristics such as reference latency, bandwidth, reliability, power, granularity, cost, and density. However, memory cost, density, and capacity demands have some recent systems integrating new architectures and technologies with conventional memory that lead to portions of the memory system having quite disparate operating characteristics and thus different operating costs (e.g., price per bit, power costs, latency costs, etc.). For example, compressed data regions or regions constructed with flash memory technology tend to have much longer access latency than conventional dynamic random access memory (DRAM) based main memory. One drawback to the use of memory with non-homogenous characteristics is that it is not always possible to predict application usage patterns in order to determine optimal storage locations for data. In addition, contemporary operating systems do not optimize storage locations in memory with non-homogenous characteristics during system initialization or while the system is operational. Storing data in a less than optimal location can result in poor runtime performance and quality of service issues.

Accordingly, and while existing memory systems may be suitable for their intended purpose, there remains a need in the art for memory systems that overcome these drawbacks.

SUMMARY

An embodiment is a system for providing page management in a memory system. The system includes at least one page table for storing a plurality of entries, each entry associated with a page of memory and each entry including an address of the page and a memory tier of the page. The system also includes a control program configured for allocating pages associated with the entries to a software module, the allocated pages from at least two different memory tiers. The system further includes an agent of the control program capable of operating independently of the control program, the agent configured for receiving an authorization key to the allocated pages, and for migrating the allocated pages between the different memory tiers responsive to the authorization key.

Another embodiment is a method for providing page management in a memory system. The method includes receiving an authorization key to access page table entries in at least one page table, the page table storing a plurality of entries, each entry associated with a page in memory and each entry including an address of the page and a memory tier of the page. The method also includes migrating the pages between at least two different memory tiers responsive to the authorization key.

A further embodiment is a computer program product, tangibly embodied on a computer readable medium, the computer program product including instructions for causing a computer to execute a method for providing page management in a memory system. The method includes receiving an authorization key to access page table entries in at least one page table, the page table storing a plurality of entries, each entry associated with a page in memory and each entry including an address of the page and a memory tier of the page. The method also includes migrating the pages between at least two different memory tiers responsive to the authorization key.

A further embodiment is a system for providing page management in a memory system. The system includes at least one page table for storing a plurality of entries, each entry associated with a page of memory and each entry including an address of the page and a memory tier of the page. The system also includes a control program configured for allocating pages associated with the entries to a software module, the allocated pages from two or more different memory tiers. The control program is also configured for migrating the allocated pages between the different memory tiers responsive to the monitoring.

Additional features and details are realized through the techniques of the present invention. Other embodiments and features are described in detail herein and are considered a part of the claimed invention. For a better understanding of features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

An embodiment is directed to managing virtual memory pages in a computer system having a tiered main memory. As used herein, the term "tiered main memory" refers to a main memory characterized by program addressable regions having disparate memory characteristics. Examples of memory characteristics include, but are not limited to: quality of service, latency, bandwidth, power utilization, density, reliability, and other reference costs. Physical memory pages having similar characteristics are grouped together, with each group referred to herein as a "memory tier." Memory tiers can be thought of as having different cost profiles (e.g., different latency, different power usage, and different reliability). In an embodiment, a virtual memory map table (e.g., a page table which may include a page table look aside buffer or "PTLB") includes at least one specific attribute for defining a memory tier (or memory cost) to a system control program to facilitate the system control program allocating memory for requests from an application that provides a "cost sensitivity" attribute when requesting memory. For example, a real time (RT) application may request memory pages with short latencies and a higher power cost. Another application may request memory pages with short latencies when the memory is read but be able to tolerate longer latencies for data writes. The foregoing are examples of characteristics of two possible memory tiers and are not intended to be limiting as each memory tier can represent a variety of different characteristics. In addition, default memory tiers (one tier or a mixture of different tiers) may be assigned to requesting software modules based on the type of program requesting the memory page or the type of data being stored.

As used herein, the term "system control program" or "control program" refers to any control program, such as, but not limited to: an operating system or "OS", a hypervisor, a basic input output system or "BIOS", and a device driver. The control program is configured (e.g., with software, hardware, and/or firmware) to perform processing described herein.

In an embodiment, the virtual memory page table (or the PTLB in the page table) contains tier attributes and reference attributes, including an optional pointer to an associative set of reference counters for allocated pages. In an embodiment, the control program or other independent agent migrates pages between different cost profiles (or tiers) to optimize system operation. In an embodiment, the page migration is done by copying a page from a page having one cost profile to a duplicate page having another cost profile and releasing the first page back to the control program free page list.

Figure 1:
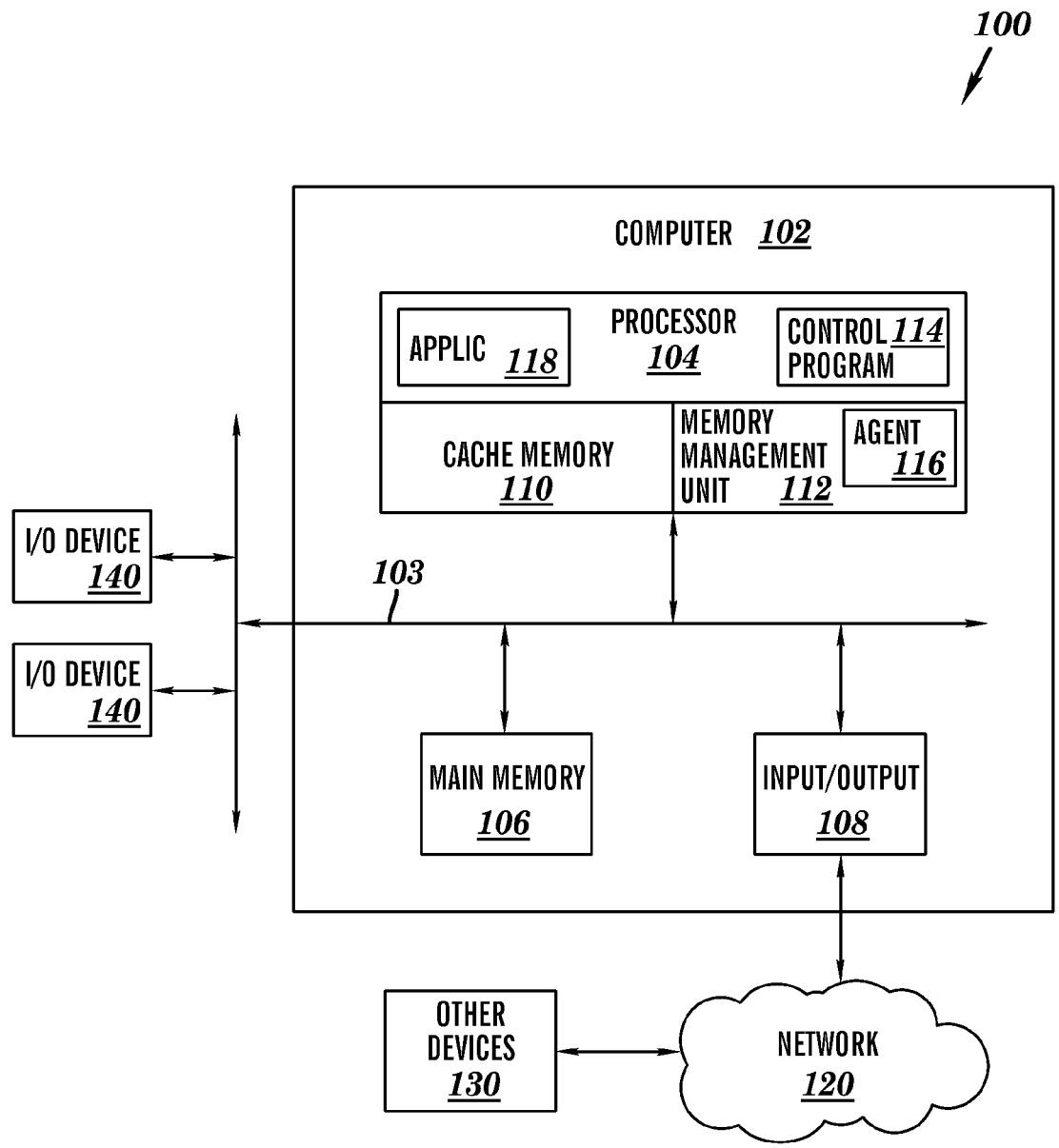
FIG. 1 is a block diagram of a system in accordance with an embodiment.

FIG. 1 illustrates an example of a system 100 for managing virtual memory pages in a computer system having a tiered main memory. The system 100 depicted in FIG. 1 includes a computer 102, a network 120 (e.g., wired or wireless) and other device(s) 130. The network 120 connects the computer 102 to the other device(s) 130 and may include one or more wide area networks (WANs) and/or local area networks (LANs) such as the Internet, intranet(s), and/or wireless communication network(s). In an embodiment, the other device (s) 130 include one or more other computers, storage devices, peripheral devices, etc. Also shown in FIG. 1 are I/O devices 140 (e.g., storage devices) communicating with the computer 102 via a bus 103 (as opposed to via the network 120).

Computer 102 includes a processor 104, a main memory ("memory") 106, and input/output component(s) 108, which are in communication via the bus 103. The processor 104 depicted in FIG. 1 includes cache memory ("cache") 110, a software module such as application 118, a control program 114, and a memory management unit (MMU) 112. In an embodiment, the MMU 112 includes components such as a page table, a free page list, and reference counters as described below. In another embodiment, all or portions of the page table, free page list and reference counters are stored in main memory 106 and/or in cache memory 110. In an embodiment, the cache memory 110 includes multiple cache levels (e.g., L1, L2, etc.) that are on or off-chip from processor 104 (e.g., an L1 cache may be on-chip, an L2 cache may be off-chip, etc.). In an embodiment, main memory 106 includes various data stored therein, e.g., instructions, software, routines, etc., which, e.g., may be transferred to/from cache memory 110 by the MMU 112 for execution by the processor 104.

In an embodiment, there are multiple tiers of main memory 106 that exhibit different characteristics such as, but not limited to: quality of service, latency, bandwidth, utilization power, density, reliability, and other reference costs. In an embodiment, pages in one tier of the main memory 106 are stored on flash memory devices and pages in another tier are stored on dynamic random access memory (DRAM) devices. As used herein, the term "memory" refers to a main memory that is directly addressable via a "real address" that is generated from the virtual address in the MMU 112. In an embodiment, a memory controller, or MMU 112, maps the real address to a physical address. Physical address regions can be disjoint or re-virtualized, however application programs are not aware of the physical addresses.

The control program 114 regulates computer system resources including cache memory 110 and main memory 106 by allocating memory to an application throughout its runtime in accordance with an embodiment. In an embodiment, the control program 114 allocates memory (e.g., resulting in one or more allocated pages) via the MMU 112.

In an embodiment, input/output component(s) 108 include one or more components that facilitate local and/or remote input/output operations to/from computer 102, such as a display, keyboard, modem, network adapter, etc. (not depicted).

As shown in the embodiment in FIG. 1, the MMU 112 includes an agent 116 configured (e.g., with software, hardware, and/or firmware) for migrating memory pages between memory tiers as described further herein below. In another embodiment, the agent 116 is located outside of the MMU 112. In an embodiment, the agent 116 operates independently of the control program 114 and is implemented in hardware, software, and/or firmware. The agent 116 operates autonomously on behalf of the control program 114. In an embodiment, the control program 114 gives the agent 116 authority to access contents of the page table and to move the physical pages associated with the logical pages in all or a subset of the page table entries. In an embodiment, the control program 114 provides the agent 116 with an authorization key (also referred to herein as a key) to allow access to all or a subset of the pages in the page table.

In an embodiment, a key is an encoding of a program process, a page and/or system run time conditions, such as, but not limited to: a process identifier, page access permissions, a memory tier, a process priority, and a system state. In an embodiment, multiple keys are issued by the control program to the agent, ranging from a default key to special application specific keys, to limited use and limited time keys. In an embodiment, the control program dynamically restricts a key(s) by changing one or more system state variables to the agent. In an embodiment, a special key is used to allow pages to be re-migrated. In an embodiment, the system state variable is used by the control program to indicate system runtime conditions such as high load or environmental stress when migration should be suspended, as well as memory over/under provisioning state to the applications by tier. For example, the control program may be running low on available high performance tier memory pages and thereby the control program may permit the agent to more aggressively discover and complete page migrations.

In an embodiment, the hardware allows the control program 114 to generate keys that can either be shared by multiple address spaces or used by a single address space. In the event that the control program generates an exclusive key, the owner of that key has the ability to unilaterally modify the pages over which that key is valid. It further restricts any other address space from modifying that range, including the control program 114 itself. As such an exclusive key obviates the need for locking between multiple agents. Another embodiment implements a semi-exclusive key that allows access by the control program 114 and only one other address space.

Figure 2:
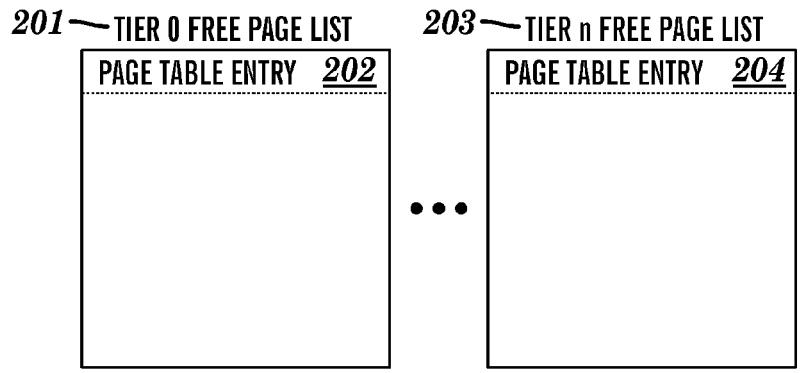
FIG. 2 is a block diagram of free page lists containing memory pages at different tiers in accordance with an embodiment.

FIG. 2 is a block diagram depicting free page lists containing memory pages at different tiers in accordance with an embodiment. One embodiment includes a single page table with entry attribute bits used to manage a main memory having multiple tiers. In this embodiment, the page table may be organized as a hierarchical structure with memory tiers easily identified at specific levels. In an embodiment, the control program 114, via the MMU 112, allocates memory pages to software modules. The memory pages that are allocated are from a free page pool list that includes a list of memory pages that are clear and ready to be allocated upon request. FIG. 2 depicts multiple free page lists 201 203 containing page table entries 202 204 of pages that are clear and ready to be allocated (i.e., free pages). As shown in the embodiment depicted in FIG. 2, one free page list 201 includes page table entries 202 that correspond to pages in "Tier 0", and another free page list 203 includes page table entries 204 that correspond to pages in "Tier n". The number of pages from each memory tier may be determined specific application requirements or based on defaults values for particular types of applications and system requirements, such as, but not limited to: memory availability, the type and priority of process or application, and an application cost sensitivity parameter when available.

In another embodiment, the agent has its own pool of pages from the control program to avoid having to go back and forth to the control program for every page allocation. In another embodiment, the agent maintains its own page pool that the control program allocates from. In another embodiment, the agent services page faults and maintains the page table for the control program.

Figure 3:
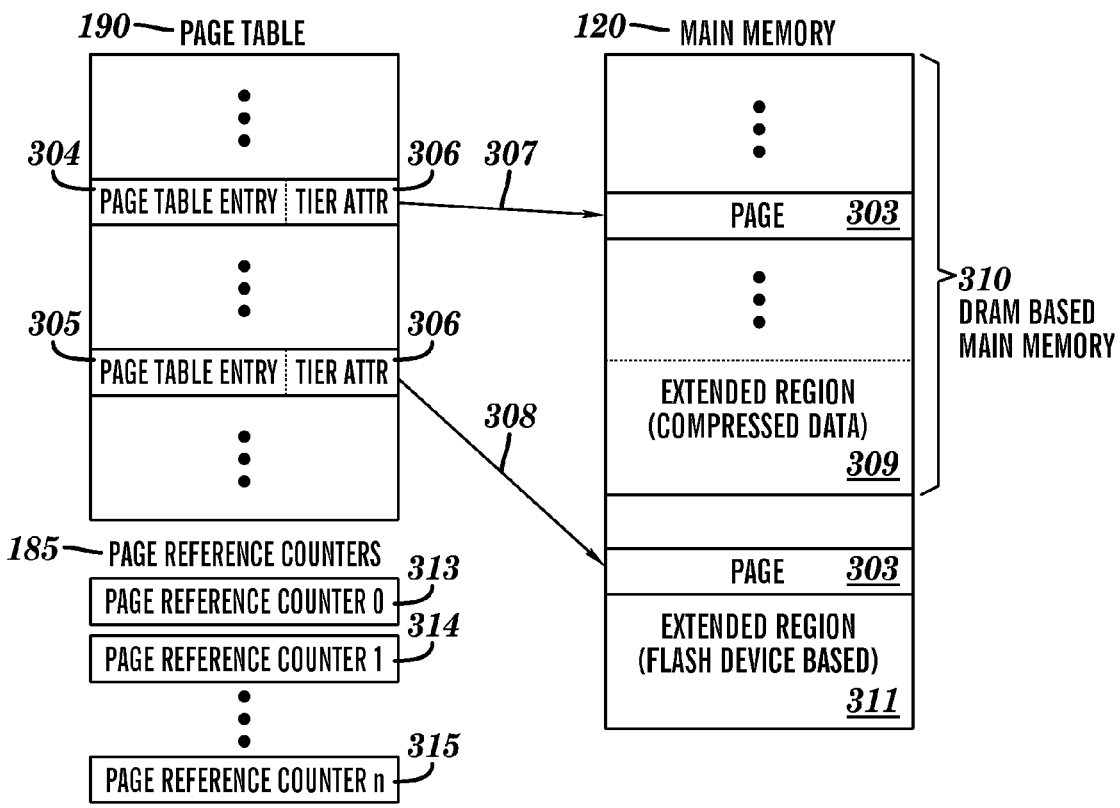
FIG. 3 is a block diagram of a page table, page reference counters, and a main memory in accordance with an embodiment.

FIG. 3 is a block diagram of a page table, page reference counters, and a main memory in accordance with an embodiment. In one embodiment, a page reference count state can be persistently or temporarily stored at specific memory locations, cache line entries, or other hardware buffer entries reused for this purpose. In another embodiment, special "fetch and op" memory reference instructions are sent to the memory controller to instruct the memory controller to increment a count value stored in cache lines or memory locations as described, for example, in U.S. Pat. No. 7,584,336. In an embodiment, the components in FIG. 3 are located in the MMU 112. FIG. 3 depicts a virtual memory arrangement including a page table, such as page table 190, containing a list of entries 304 305. The entries 304 305 in the page table are associated with pages 303 of main memory 106 and include an address of the page (e.g., a virtual address) and a memory tier attribute field 306 identifying a memory tier of the page 303. In an embodiment, a combination of the virtual address and a page address in the page table 190 is used to construct main memory physical memory addresses 307 308 of the pages 303. In an embodiment, the page table 190 is very large and is stored in main memory 106 and a PTLB is implemented in hardware near a processor fetch and execute unit to minimize the latency for referencing a page table entry to form a physical memory address 307 308 and to validate authorized access to the main memory 106.

In an alternate embodiment, page table entries are stored in a memory tier optimized for page table reference.

As shown in FIG. 3, a memory tier attribute field 306 in a page table entry, such as entry 304, identifies the tier, and optionally, if the page 303 is locked to the tier and/or if the page 303 is being monitored for usage patterns. In an embodiment, a usage pattern monitor counter and associated control state register is selected by a direct mapping from the page address, but alternative embodiments may use other combinations of the virtual address and page address, a separate dedicated field or field of renamed bits to identify the counter.

In FIG. 3, the counter and control state registers are collectively referred to as page reference counters 185 and include page reference counter zero 313, page reference counter one 314, and so on, up to page reference counter n 315. In an embodiment, one or more of the reference page counters 185 are configured to measure page access patterns by the system control program and/or by an independent hardware or software agent 116 having an authorization key to optimize the page allocation for specific applications, processes and/or pages as defined by the control program. When a page counter access pattern exceeds a prescribed threshold and/or when a specific access pattern is detected, the agent 116 can allocate or request the control program to allocate a new page from another memory tier. The agent 116 then blocks write access to the old page while it is copied to the new page in a different memory tier. Then the old page is disabled and the new page enabled with the permissions from the old page. The agent 116 systematically cycles through the running processes and pages that are authorized for optimization measuring and re-optimizing page allocations. Pages that are released during the optimization process cause the counter state to be invalidated and the counter to be released and reconfigured for use with another page. In one embodiment, coherency between replicated pages during the copy procedure is maintained without blocking write accesses. In this case copy progress counters are used as limits to allow writes to portions of the either page being copied as described, for example, in U.S. Pat. No. 6,339,813. In another embodiment, a list of modified cache lines are maintained to allow the copy process to skip memory writes made to a new page before copy.

Referring to FIG. 3, in one example, page reference counter zero 313 is monitoring references to page table entry 305 which is associated with page 303 at physical memory address 308 in the main memory 106. In this example, page 303 at physical memory address 308 is located on FLASH device based memory 311, which is located in memory tier zero. Thus, the memory tier attribute field 306 in the page table entry 305 indicates memory tier zero and was allocated from the tier zero free page list 201. In an embodiment, the software module requesting memory requests a specific memory tier or mix of memory tiers. In another embodiment, the control program or agent 116 determines the memory tier based on attributes of the requesting software module (e.g., real-time, batch), the type of data to be stored (e.g., compressed) and/or current availability of memory at different tiers.

In this example, accesses to the physical memory address 308 are monitored by the agent 116, using for example, page reference counter zero 313. In an embodiment, the agent 116 receives authorization (e.g., via an exclusive or non-exclusive key) to monitor and migrate pages between memory tiers (e.g., for a specified software module) from a control program, such as control program 114. The agent 116 monitors references and looks for specified reference patterns, such as but not limited to: a specified number of reads, a specified number of writes with a specified time period, a total number of accesses, a read followed by a write a specified number of times, etc.). In this example, the agent 116 uses page reference counter zero 313 to count the number of write accesses to the physical memory address 308. When the number of write accesses reaches a specified number, then the agent 116 migrates the data located at physical memory address 308 to a physical memory address at a memory tier with faster access speeds. In this example, this is memory tier n, a DRAM based main memory 310 having an extended region 309. In an embodiment, the migrating includes: allocating page table entry 204 from the tier n free page list 203 to the software module, where page table entry 204 is associated with a page 303 at physical memory address 307; copying the data from the page 303 at physical memory address 308 into the page 303 at physical memory address 307, updating page table entry 304 with any permissions or other system data from page table entry 305; and deallocating the current page from the software module by moving page table entry 305 into the tier zero free page list 201.

The above example is intended to explain one scenario that may be implemented by an embodiment in order to illustrate various features. This example should not be construed as limiting as other scenarios may be implemented by other embodiments.

Figure 4:
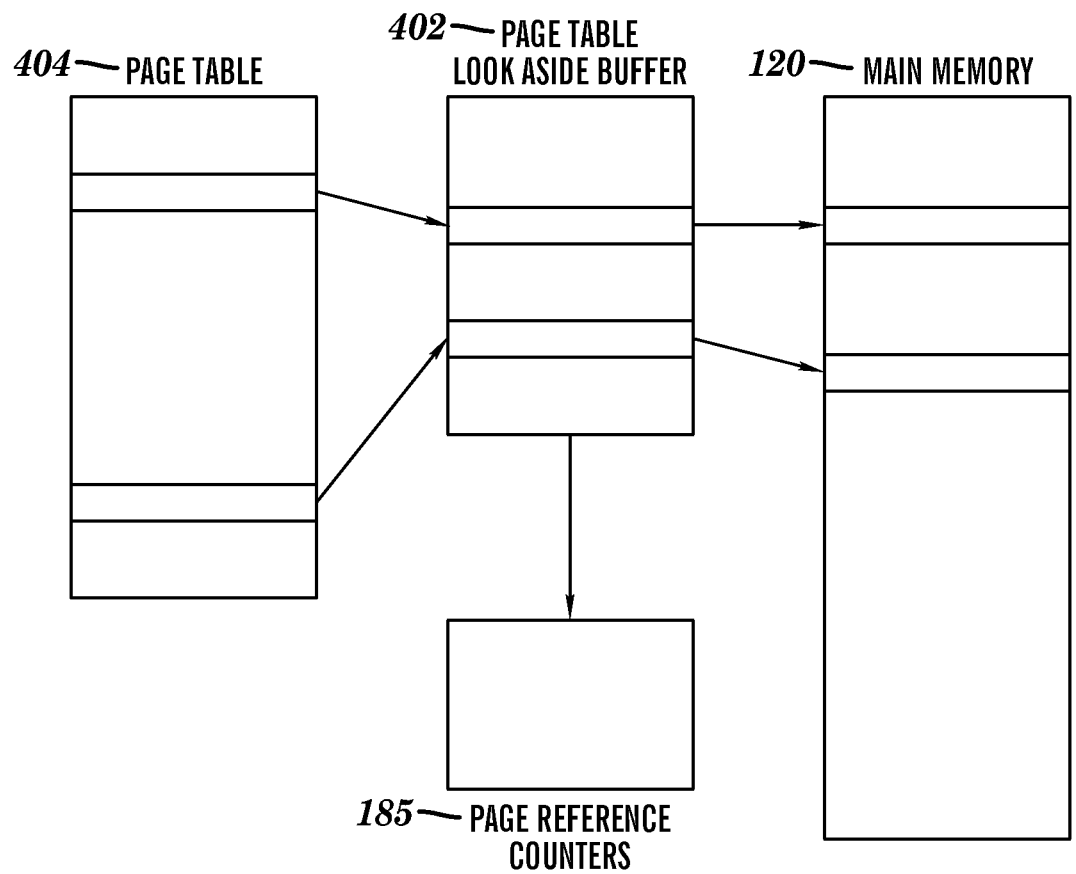
FIG. 4 is a block diagram of a page table, a page table look aside buffer, page reference counters and a main memory in accordance with an embodiment.

FIG. 4 is a block diagram of a system that includes a page table 404 that includes a PTLB 402, page reference counters 185 and a main memory 106 in accordance with an embodiment. As shown in FIG. 4 the page table 404 includes PTLB 402 that is used to contain a limited number of active page table entries for a processor. In this embodiment, where the buffer (i.e., the PTLB 402) is small and fast, entries may contain additional bits per entry at a relatively low cost. In an embodiment counter bits are temporary along with the swap activity, and additional bits are stored in the PTLB 402 to point to page reference counters 185. In an embodiment, when a PTLB 402 is full and a page miss occurs, an old entry has to be removed to make room for the new entry. In this case, the page monitoring/swapping process is prioritized so that the page is not replaced unless the priority is disabled by the control program 114. For example, in an embodiment, the PTLB 402 is replaced using an algorithm such as a least recently used (LRU) algorithm. When a page migration has progressed past a point of firm commitment, the associated PTLB entry replacement priority is adjusted to prevent replacement in lieu of some other PTLB entry. In an embodiment, a PTLB process is implemented where one or more page table entries are invalidated because the pages are to be released back to the control program 114, usually due to the process termination or because the memory is no longer needed. In this embodiment, the page monitoring/swapping is terminated to facilitate the PTLB process. In the embodiment depicted in FIG. 4, the counter page swap hardware is configured to work with the PTLB state, thus avoiding having to reference the page table 404.

As used herein, the term "page table" refers to a page table 190 such as the one depicted in FIG. 3. In addition, as used herein, the term "page table" refers to a page table 404 that includes a PTLB 402 as depicted in FIG. 4. Entries in a page table (e.g., page table 190, and page table 404 including PTLB 402) are referred to herein as "page table entries".

An embodiment supports a key mechanism that provides different protection within entries with the PTLB 402. In this embodiment, a key is assigned to a selected range of memory covered by a PTLB 402 (or several PTLBs 402 if contguous).

Figure 5:
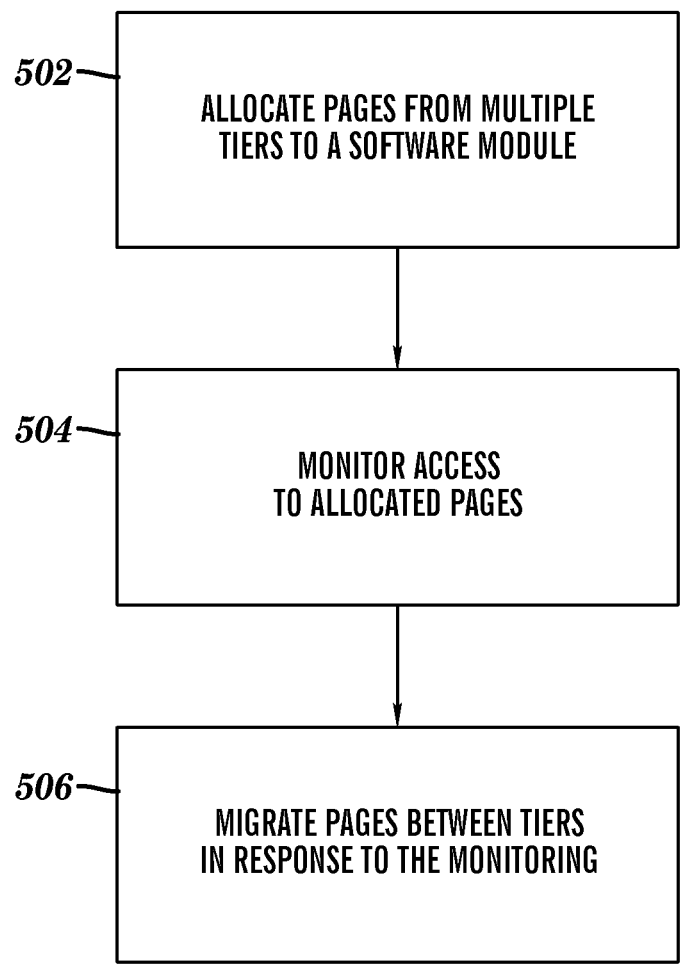
FIG. 5 depicts a process flow that is implemented by an embodiment.

FIG. 5 depicts a process flow that is implemented by an embodiment of the agent 116 and/or the control program 114. At block 502, pages from multiple memory tiers are allocated to one or more software modules, such as application 118. At block 504, references (read access, write access, etc.) to all or a subset of the allocated pages are monitored. In an embodiment, the monitoring is performed by the control program 114. In another embodiment, the monitoring is performed by the agent 116 acting independently of, but on behalf of, the control program 114 in response to receiving an authorization key. The authorization key may be for access to page table entries associated with one or more specified processes, for page table entries associated with specified memory tiers, for page table entries associated with pages storing specified data types, or any other grouping of page table entries. In an embodiment, the monitoring at block 504 is performed only when the key enables the monitoring or when the references have not been previously monitored.

At block 506, the control program 114 or agent 116 migrate pages between the memory tiers based on data collected during the monitoring. In an embodiment, the agent 116 requests the control program 114 to migrate pages. In another embodiment, the agent 116 migrates the pages specified by the authorization key. In an embodiment, the decision to migrate pages depends on reaching a reference threshold that varies based on a specified process, a specified memory tier, and/or a specified data type. This allows the system flexibility in deciding when to migrate between the memory tiers. For example, in a real time transaction environment, a fewer total number of access within a period of time might trigger migration to a faster memory tier; than the total number of access required by an offline process.

In another embodiment, the decision to migrate pages depends on detecting a specified reference pattern to one (or more) of the pages and/or on detecting a specified number of references within a specified time period to one (or more) of the pages. In an embodiment, a page is migrated only when a reference pattern exceeds a threshold. Any kind of threshold may be implemented. For example, a threshold may specify that a read only page for a non-critical process that has less than two references in a check period is a candidate for migrating from a high performance memory tier to a low performance memory tier. A page may meet the criteria of the threshold for a variety of reasons such as a high hit rate in the cache or that limited data was needed from the page, in any case it is a good candidate to migrate from high performance memory.

In an embodiment, processing continues at block 504 once the migrating is complete. In an embodiment, the cycle of performing blocks 504 and 506 continues to be repeated while the system in operational (e.g., during system runtime). In another embodiment, the mentoring at block 504 and/or the migrating at block 506 is aborted when a page is retired.

Technical effects and benefits include the ability to optimize memory page locations of data based on conditions observed during system run time. This may lead to more efficient use of memory and to better memory system performance. The use of an agent to off-load the operating by performing the optimizing can lead to better overall system performance.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for providing page management in a memory system, the system comprising:
    at least one page table for storing a plurality of entries, each entry associated with a page of memory and each entry comprising an address of the page and a memory tier of the page;
    a control program configured for allocating pages associated with the entries to a software module, the allocated pages from at least two different memory tiers; and
    an agent of the control program capable of operating independently of the control program, the agent configured for receiving an authorization key to the allocated pages from the control program and for migrating the allocated pages between the different memory tiers responsive to the authorization key being received by the agent.

2. The system of claim 1, wherein the agent is further configured for monitoring references to the allocated pages in response to receiving the authorization key, the migrating further responsive to the monitoring.

3. The system of claim 2, further comprising a plurality of counters, the monitoring comprising using the counters to count references to at least one of the allocated pages.

4. The system of claim 3, wherein the counters are stored in at least one of a memory location, a cache line entry, and a hardware buffer.

5. The system of claim 2 wherein the migrating is performed in response to the monitoring detecting a specified reference pattern to an allocated page.

6. The system of claim 1, wherein the authorization key is exclusive to the agent.

7. The system of claim 1, wherein the migrating comprises:
identifying a current page in the allocated pages to be migrated, the current page in a first memory tier;
allocating a new page to the software module, the new page in a second memory tier different from the first memory tier;
copying data from the address of the current page to the address of the new page; and
deallocating the current page from the software module.

8. The system of claim 7, wherein coherency is maintained between the new page and the current page during the copying without blocking write accesses to the new page and the current page.

9. The system of claim 1, wherein the authorization key provides access to page table entries associated with one or more specified processes.

10. The system of claim 1, wherein the authorization key provides access to page table entries associated with specified memory tiers.

11. The system of claim 1, wherein the authorization key provides access to page table entries associated with pages storing specified data types.

12. The system of claim 1, wherein the authorization key provides access to pages associated with a subset of the entries in the page table.

13. A method for providing page management in a memory system, the method comprising:
receiving an authorization key to access page table entries in at least one page table from a control program, the page table storing a plurality of entries, each entry associated with a page in memory and each entry comprising an address of the page and a memory tier of the page; and
migrating the pages between at least two different memory tiers responsive to the authorization key being received from the control program.

14. The method of claim 13, further comprising monitoring references to the page table entries in response to receiving the authorization key, the migrating further responsive to the monitoring.

15. The method of claim 14, wherein the migrating is further responsive to a reference threshold that varies based on at least one of a specified process, a specified memory tier, and a specified data type.

16. The method of claim 14, wherein the migrating is further responsive to detecting a specified reference pattern to one of the pages.

17. The method of claim 13, wherein the authorization key is received from the control program, and the receiving and migrating are performed by an agent of the control program that operates independently of the control program.

18. A computer program product, tangibly embodied on a non-transitory computer readable storage medium, the computer program product including instructions for causing a computer to execute a method for providing page management in a memory system, the method comprising:
receiving an authorization key to access page table entries in at least one page table from a control program, the page table storing a plurality of entries, each entry associated with a page in memory and each entry comprising an address of the page and a memory tier of the page; and
migrating the pages between at least two different memory tiers responsive to the authorization key being received from the control program.

19. The computer program product of claim 18, wherein the method further comprises monitoring references to the page table entries in response to receiving the authorization key, and the migrating is further responsive to the monitoring.

20. The computer program product of claim 19, wherein the migrating is further responsive to a reference threshold that varies based on at least one of a specified process, a specified memory tier, and a specified data type.

21. The computer program product of claim 18, wherein the authorization key provides access to at least one of page table entries associated with one or more specified processes, page table entries associated with specified memory tiers, and page table entries associated with pages storing specified data types.

22. A system for providing page management in a memory system, the system comprising:
at least one page table for storing a plurality of entries, each entry associated with a page of memory and each entry comprising an address of the page and a memory tier of the page; and
a control program configured for:
allocating pages associated with the entries to a software module, the allocated pages from two or more different memory tiers;
receiving an authorization key to the allocated pages;
monitoring references to the allocated pages responsive to the authorization key being received; and
migrating the allocated pages between the different memory tiers responsive to the monitoring.

23. The system of claim 22, further comprising a plurality of counters, the monitoring comprising using the counters to count references to at least one of the allocated pages, the references comprising one or more of read references, write references, and all references.

24. The system of claim 22, wherein the migrating is performed in response to the monitoring detecting a specified reference pattern to an allocated page and the migrating comprises:
identifying a current page in the allocated pages to be migrated, the current page in a first memory tier;
allocating a new page to the software module, the new page in a second memory tier different from the first memory tier;
copying data from the address of the current page to the address of the new page; and
deallocating the current page from the software module.

* * * * *